(12) United States Patent
Hashimoto et al.

(10) Patent No.: US 9,324,325 B2
(45) Date of Patent: Apr. 26, 2016

(54) CONVERTING DATA BETWEEN USERS DURING A DATA EXCHANGE SESSION

(71) Applicant: INTERNATIONAL BUSINESS MACHINES CORPORATION, Armonk, NY (US)

(72) Inventors: Kensuke Hashimoto, Tokyo (JP); Yohichi Hattori, Yokohama (JP); Taroh Sanui, Tokyo (JP); Hisae Shiiki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/444,224

(22) Filed: Jul. 28, 2014

(65) Prior Publication Data

US 2015/0073789 A1    Mar. 12, 2015

(30) Foreign Application Priority Data

Sep. 11, 2013   (JP) ................................. 2013-188335

(51) Int. Cl.
| | |
|---|---|
| *G10L 15/26* | (2006.01) |
| *G10L 15/30* | (2013.01) |
| *G10L 15/02* | (2006.01) |
| *G10L 15/00* | (2013.01) |
| *G10L 15/22* | (2006.01) |

(52) U.S. Cl.
CPC .............. *G10L 15/265* (2013.01); *G10L 15/22* (2013.01); *G10L 15/30* (2013.01); *G10L 15/005* (2013.01); *G10L 15/26* (2013.01); *G10L 2015/025* (2013.01); *G10L 2015/221* (2013.01)

(58) Field of Classification Search
CPC .............................. G10L 15/265; G10L 15/30
USPC ............... 704/1–10, 200, 203, 231, 238, 245, 704/246, 260, 275
See application file for complete search history.

(56) References Cited

U.S. PATENT DOCUMENTS

| | | | | |
|---|---|---|---|---|
| 5,526,259 A | * | 6/1996 | Kaji .......................... | G06F 3/16 704/254 |
| 2008/0270129 A1 | * | 10/2008 | Colibro ................... | G10L 15/19 704/236 |
| 2012/0022854 A1 | * | 1/2012 | Hoshino ............. | G06F 3/04883 704/9 |

FOREIGN PATENT DOCUMENTS

| | | |
|---|---|---|
| JP | 05014884 | 1/1993 |
| JP | 06096114 | 4/1994 |
| JP | 07087472 | 3/1995 |
| JP | 08077174 | 3/1996 |
| JP | 09305608 | 11/1997 |
| JP | 2000184345 | 6/2000 |
| JP | 2003263192 | 9/2003 |
| JP | 2005184583 | 7/2005 |
| JP | 2008233963 | 10/2008 |
| JP | 2010152561 | 7/2010 |

\* cited by examiner

*Primary Examiner* — Marcellus Augustin
(74) *Attorney, Agent, or Firm* — Schmeiser, Olsen & Watts; John Pivnichny (57) ABSTRACT

A method and system for converting voice data to text data between users is provided. The method includes receiving voice data from at least one user and determining phoneme data items corresponding to the voice data. Conversion candidate string representations of the phoneme data items are identified by referencing a conversion dictionary defining the conversion candidate string representations for each phoneme data item. The plurality of conversion candidate string representations are scored and a specified conversion candidate string representation is selected as text data based on the scores. The text data is transmitted to a terminal device accessed by the at least one user.

20 Claims, 9 Drawing Sheets

| Character String | Meaning |
|---|---|
| 公正・公平な年金制度 | Fair and Equitable Pension System |
| 三階建て構成 | Three-Tiered Structure |
| 確定拠出 | Defined Contribution |
| 確定給付 | Defined Benefit |
| 共済年金 | Mutual Pension |
| 厚生年金 | Employee Pension |
| 国民年金 | National Pension |
| 公務員 | Public Employees |
| サラリーマン | Company Employees |
| 自営業者 | Self-Employed Persons |

FIG. 7

| Score | Selection Candidates |
|---|---|
| 4 | 三階建て |
|   | 構成 |
| 3 | 公正 |
|   | 公平な |
|   | 年金 |
|   | 制度 |
|   | 確定 |
|   | 拠出 |
|   | 給付 |
|   | 共済 |
|   | 厚生 |
|   | 国民 |
|   | 公務員 |
|   | サラリーマン |
|   | 自営業者 |
| 2 | (Groups of strings on previously shared pages) |
| 1 | (Groups of strings on pages in shared document but not in shared history) |

| Character String | Meaning |
|---|---|
| 三階建て | Three-Tiered |
| 構成 | Structure |
| 公正 | Fair |
| 公平な | Equitable |
| 年金 | Pension |
| 制度 | System |
| 確定 | Defined |
| 拠出 | Contribution |
| 給付 | Benefit |
| 共済 | Mutual |
| 厚生 | Employee |
| 国民 | National |
| 公務員 | Public Employee |
| サラリーマン | Company Employee |
| 自営業者 | Self-Employed Person |

|   | Character Representation | Phonemic Transcription | Meaning |
|---|---|---|---|
| 1 | 構成 | /kousei/ | Structure |
| 2 | 公正 | /kousei/ | Fair |
| 3 | 校正 | /kousei/ | Calibration |
| 4 | 後世 | /kousei/ | Posterity |
| 5 | 攻勢 | /kousei/ | Offensive |
| 6 | 厚生 | /kousei/ | Employee |
| 7 | 更生 | /kousei/ | Rehabilitation |
| 8 | 恒星 | /kousei/ | Fixed Star |
| 9 | 鋼製 | /kousei/ | Made of Steel |

CONVERTING DATA BETWEEN USERS DURING A DATA EXCHANGE SESSION

FIELD

The present invention relates to an apparatus and a method for converting data which may include a device and method for converting data in a system used by multiple users to exchange data.

BACKGROUND

With the spread of the internet in recent years, various types of systems enabling multiple users to exchange data have been realized. Examples include electronic conferencing systems and chat systems. Data inputted by a user is sometimes converted in these systems. For example, in an electronic conferencing system, the speech of a user is sometimes converted into text data. In a chat system, text data submitted by a user in a first language is converted to text data in a second language. Techniques are known for converting data in these systems enabling the exchange of data. Accordingly, there exists a need in the art to overcome at least some of the deficiencies and limitations described herein above.

BRIEF SUMMARY

A first aspect of the invention provides a method for converting voice data to text data, the method comprising: receiving, by a computer processor of a computing system executing a receiving unit, voice data from a terminal device used by at least one user of a plurality of users; determining, by the computer processor executing a recognition unit, phoneme data items corresponding to the voice data; identifying, by the computer processor executing an identifying unit, conversion candidate string representations of the phoneme data items by referencing a conversion dictionary defining the conversion candidate string representations for each phoneme data item of the phoneme data items; scoring, by the computer processor executing a scoring unit, the plurality of conversion candidate string representations displayed on a shared screen viewed by the plurality of users during a data exchange session, the scoring comprising: assigning a first score to a first conversion candidate string representation of the plurality of conversion candidate string representations, wherein the first conversion candidate string representation is displayed within a predetermined range of a cursor on the shared screen during reception of the voice data, assigning a second score to a second conversion candidate string representation of the plurality of conversion candidate string representations, wherein the second conversion candidate string representation is displayed outside of the predetermined range of the curser on the shared screen during reception of the voice data, and wherein the second score is less than the first score, and assigning a third score to a third conversion candidate string representation of the plurality of conversion candidate string representations, wherein the third conversion candidate string representation is displayed on the shared screen prior to reception of the voice data, and wherein the third score is less than the second score; selecting as text data, by the computer processor from the plurality of conversion candidate string representations, the first conversion candidate string representation, the second conversion candidate string representation, or the third conversion candidate string representation based on the first score, the second score, and the third score; transmitting, by the computer processor, the text data to a terminal device accessed by the at least one user.

A second aspect of the invention provides a computing system comprising a computer processor coupled to a computer-readable memory unit, the memory unit comprising instructions that when executed by the computer processor implements a method comprising: receiving, by the computer processor executing a receiving unit, voice data from a terminal device used by at least one user of a plurality of users; determining, by the computer processor executing a recognition unit, phoneme data items corresponding to the voice data; identifying, by the computer processor executing an identifying unit, conversion candidate string representations of the phoneme data items by referencing a conversion dictionary defining the conversion candidate string representations for each phoneme data item of the phoneme data items; scoring, by the computer processor executing a scoring unit, the plurality of conversion candidate string representations displayed on a shared screen viewed by the plurality of users during a data exchange session, the scoring comprising: assigning a first score to a first conversion candidate string representation of the plurality of conversion candidate string representations, wherein the first conversion candidate string representation is displayed within a predetermined range of a cursor on the shared screen during reception of the voice data, assigning a second score to a second conversion candidate string representation of the plurality of conversion candidate string representations, wherein the second conversion candidate string representation is displayed outside of the predetermined range of the curser on the shared screen during reception of the voice data, and wherein the second score is less than the first score, and assigning a third score to a third conversion candidate string representation of the plurality of conversion candidate string representations, wherein the third conversion candidate string representation is displayed on the shared screen prior to reception of the voice data, and wherein the third score is less than the second score; selecting as text data, by the computer processor from the plurality of conversion candidate string representations, the first conversion candidate string representation, the second conversion candidate string representation, or the third conversion candidate string representation based on the first score, the second score, and the third score; transmitting, by the computer processor, the text data to a terminal device accessed by the at least one user.

A third aspect of the invention provides a computer program product, comprising a computer readable hardware storage device storing a computer readable program code, the computer readable program code comprising an algorithm that when executed by a computer processor of a computing system implements a method, the method comprising: receiving, by the computer processor executing a receiving unit, voice data from a terminal device used by at least one user of a plurality of users; determining, by the computer processor executing a recognition unit, phoneme data items corresponding to the voice data; identifying, by the computer processor executing an identifying unit, conversion candidate string representations of the phoneme data items by referencing a conversion dictionary defining the conversion candidate string representations for each phoneme data item of the phoneme data items; scoring, by the computer processor executing a scoring unit, the plurality of conversion candidate string representations displayed on a shared screen viewed by the plurality of users during a data exchange session, the scoring comprising: assigning a first score to a first conversion candidate string representation of the plurality of conversion candidate string representations, wherein the first conversion candidate string representation is displayed within a predetermined range of a cursor on the shared screen during reception of the voice data, assigning a second score to a second conversion candidate string representation of the plurality of conversion candidate string representations, wherein the second conversion candidate string representation is displayed outside of the predetermined range of the curser on the shared screen during reception of the voice data, and wherein the second score is less than the first score, and assigning a third score to a third conversion candidate string representation of the plurality of conversion candidate string representations, wherein the third conversion candidate string representation is displayed on the shared screen prior to reception of the voice data, and wherein the third score is less than the second score; selecting as text data, by the computer processor from the plurality of conversion candidate string representations, the first conversion candidate string representation, the second conversion candidate string representation, or the third conversion candidate string representation based on the first score, the second score, and the third score; transmitting, by the computer processor, the text data to a terminal device accessed by the at least one user.

The present invention is able to improve the accuracy of data conversion in systems enabling multiple users to exchange data.

DETAILED DESCRIPTION

The following is a detailed explanation of an embodiment of the present invention with reference to the drawings. The embodiment of the present invention may be embodied in any system enabling multiple users to exchange data (e.g., an electronic conferencing system, a chat system, an electronic conferencing system, etc.

As business becomes more globalized, overseas employees often participate in a single project and business is conducted remotely. When business is conducted remotely, communication can pose a problem for project management. In other words, smooth horizontal connections and vertical connections for business reporting and technology transfers can be critical to the success of a project. In order to improve overall project efficiency and reduce costs, opportunities for face-to-face communication have been curtailed as part of communication planning. Electronic conferencing systems using the phone and the internet have become critical as an alternative communication tool.

However, when participants in an electronic conference (conference participants) share spoken content in an electronic conferencing system, it is not enough to rely on the voices of conference participants. For example, when the quality of a participant's voice or the quality of a microphone or communication line is poor, it may be difficult for others to hear what is being said and participants often end up repeating themselves. When overseas employees participate in a conference with others in a language other than their native tongue, they may have trouble keeping up with what is being said in the conference. Therefore, from the standpoint of project management, stress on participants may actually increase when electronic conferencing is used as a communication tool, and this may pose a threat to project execution.

The present embodiment is able to improve the accuracy of voice to text conversion during a conference using an electronic conferencing system by extracting terminology shared by conference participants on the shared screen of the electronic conferencing system, and using this terminology in the conversion of voice data to text data. In this way, the voice commentary of all conference participants can be displayed as text subtitles in real time and also recorded.

Figure 1:
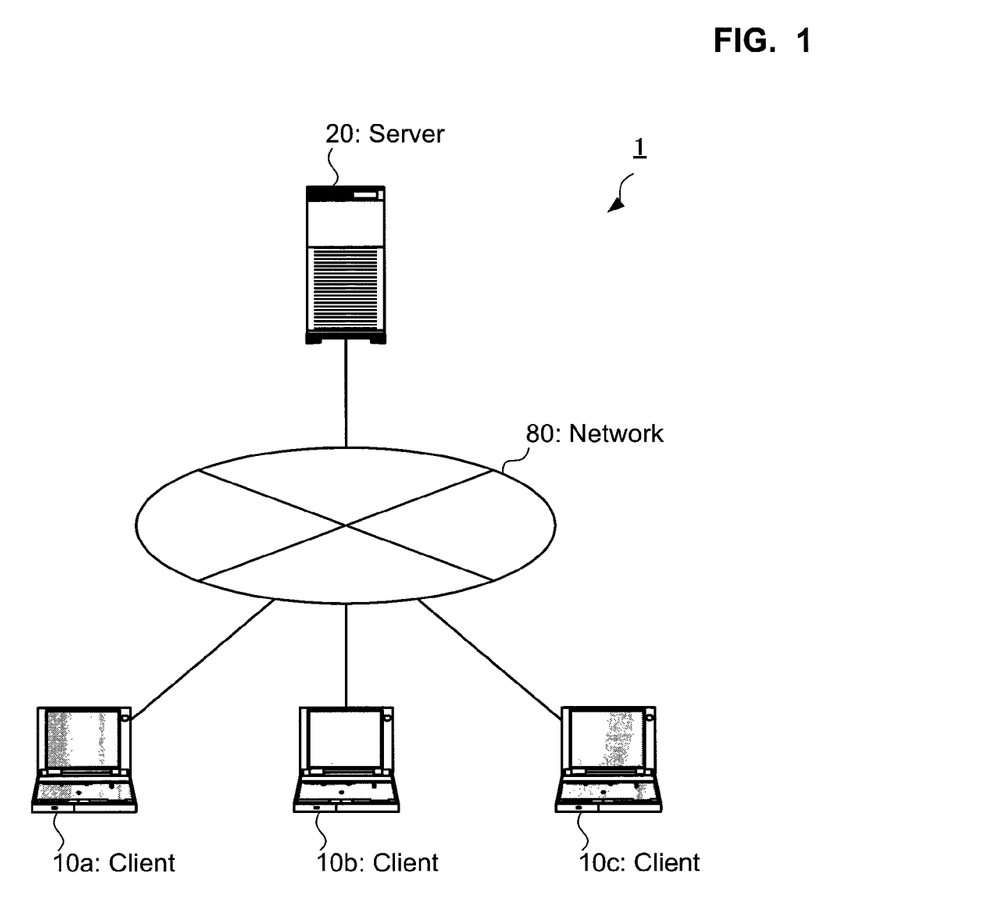
FIG. 1 is a diagram showing an example of the overall configuration of the electronic conferencing system in accordance with embodiments of the present invention.

FIG. 1 is a diagram showing the overall configuration of the electronic conferencing system 1 in accordance with embodiments of the present invention. As shown in the drawing, the electronic conferencing system 1 connects clients 10a, 10b, 10c to a server 20 via a network 80.

The clients 10a, 10b, 10c are computers used by participants in an electronic conference to enter and display information. Information entered during an electronic conference comprises voice commentary by the various conference participants. The information displayed during an electronic conference takes the form of screens displaying information that can be viewed by each conference participant. Here, a screen that displays the same information for all conference participants to view is a screen shared by all conference participants and is referred to as a "shared screen". In other words, each conference participant participates in the electronic conference while viewing the same shared screen at different locations. In this drawing, there are three clients. Client 10a is used by conference participant Ua at location La, client 10b is used by conference participant Ub at location Lb, and client 10c is used by conference participant Uc at location Lc. However, the present invention may include four or more clients. When a distinction is not being made between clients 10a, 10b and 10c, the clients are referred to collectively as "clients 10" in the following explanation. In the present embodiment, a client 10 is an example of a terminal device. Also, a conference participant is an example of a user, and the shared screen is an example of a screen viewed by all users during a session of an electronic conference.

The server 20 is a computer used to manage the electronic conference. When conference participants Ua, Ub and Uc participate (login) via clients 10a, 10b, 10c in response to an invitation to participate in an electronic conference on a certain subject, the server 20 generates a session for the electronic conference, and manages the identifying information for the session, the identifying information for the conference participants Ua, Ub, Uc, and the identifying information for the clients 10*a*, 10*b*, 10*c*. When the conference participants Ua, Ub, Uc enter information via the clients 10*a*, 10*b*, 10*c*, the information is sent to the other client 10 or a shared screen is sent to the clients 10*a*, 10*b*, 10*c*. When the conference participants Ua, Ub, Uc have left the electronic conference (logged out), the session is terminated.

The network 80 is the communication means used to exchange information during the electronic conference. Examples of networks 80 include the internet and a local area network (LAN).

In the present embodiment, voice comments are acquired by the clients 10, and the server 20 converts the voice data into text data, and displays the text data in the comment display area (described below) provided by the electronic conferencing system 1.

Figure 2:
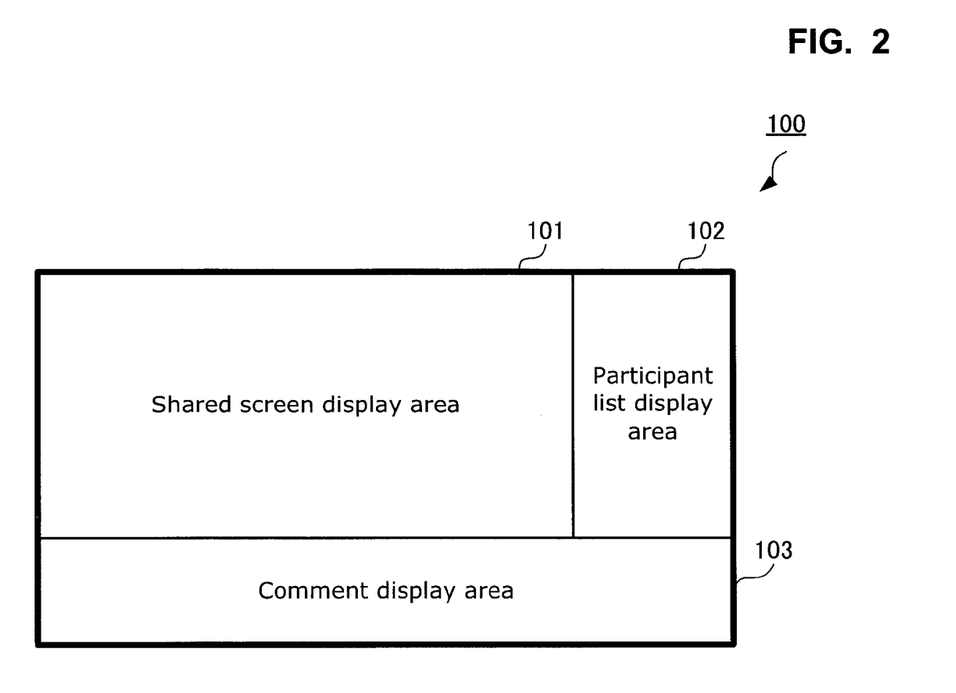
FIG. 2 is a diagram showing an example of an electronic conferencing screen for displaying the electronic conferencing system to a client in accordance with embodiments of the present invention.

FIG. 2 is a diagram showing an example of an electronic conferencing screen 100 for displaying the electronic conferencing system 1 to each client 10, in accordance with embodiments of the present invention. As shown in the drawing, the electronic conferencing screen 100 includes a shared screen display area 101, a participant list display area 102, and a comment display area 103.

The shared screen display area 101 is an area used to display the shared screen shared by the conference participants. When conference participants Ua, Ub and Uc are participating in an electronic conference, the shared screen is presented to conference participants Ua, Ub and Uc. The shared screen displayed on the shared screen display area 101 displays documents shared by conference participants Ua, Ub and Uc (referred to below as "shared documents").

The participant list display area 102 is the area in which a list of conference participants is displayed. When conference participants Ua, Ub and Uc are participating in the electronic conference, a list of information identifying conference participants Ua, Ub and Uc (such as their names) is displayed.

The comment display area 103 is an area for displaying the text data for comments made by conference participants. When conference participants Ua, Ub and Uc are participating in the electronic conference, the comments of conference participant Ua, conference participant Ub and conference participant Uc are acquired by client 10*a*, client 10*b* and client 10*c*, the voice comments are converted to text data by the server 20, and the text data is displayed in the comment display area 103. In the present embodiment, the server 20 converts voice comments to text data, and the text data is displayed in the comment display area 103, which is added to the electronic conferencing screen 100 for the present embodiment.

In the present embodiment, the server 20 performs the following processing when displaying text data in the comment display area 103. In order to perform a speedy and accurate analysis when converting the results of speech recognition to text data, words displayed on the shared screen are given priority over the words stored in an existing conversion dictionary when voice data is converted to text data.

As explained below in greater detail, words are used in the following order of priority to match the pronunciation of words in the speech recognition results. First, words near the position of the pointer placed over a shared document on the shared screen by a conference participant are used. Second, words currently appearing on the shared screen are used. Third, words which have appeared in the shared document but are no longer being displayed in the section of the shared document currently appearing on the shared screen are used. Fourth, words included in the shared document currently being displayed are used. Fifth, words included in the conversion dictionary referenced during conversion of voice data to text data are used. Here, single words are picked up from the shared screen when converting voice data to text data, but phrases including multiple words can also be picked up.

Text data obtained from converting voice data can be retained in a speech history. The text data can also be copied to a clipboard. In this way, the present embodiment can be used to help create meeting minutes.

Figure 3:
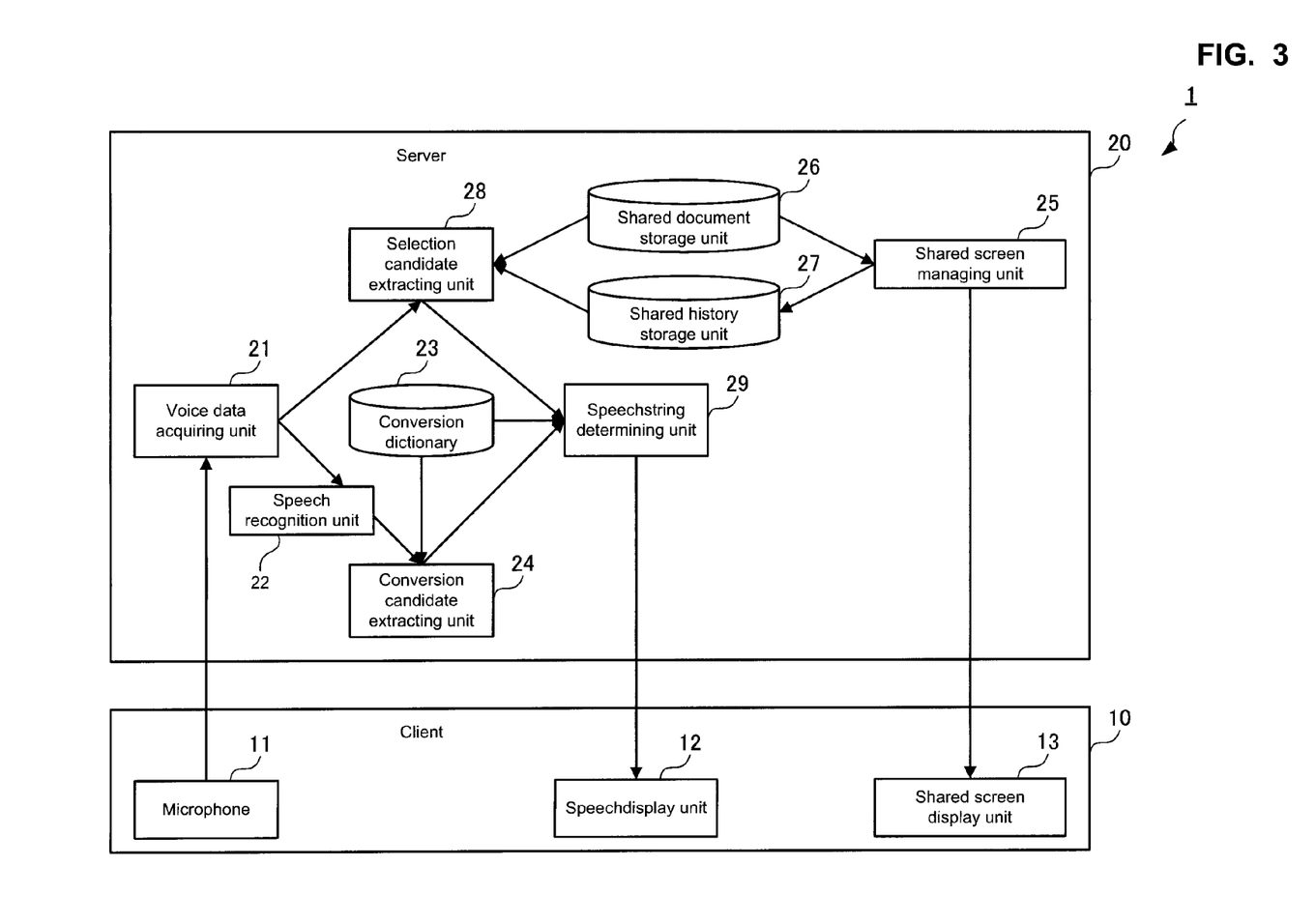
FIG. 3 is a block diagram showing an example of a function configuration for the electronic conferencing system in accordance with embodiments of the present invention.

FIG. 3 is a block diagram showing an example of a functional configuration for the electronic conferencing system 1 in accordance with embodiments of the present invention. Clients 10*a*, 10*b* and 10*c* are shown in FIG. 1, but in FIG. 3 they are represented collectively as client 10. The electronic conferencing system 1 includes a client 10 and a server 20. The client 10 includes a microphone 11, a speech display unit 12, and a shared screen display unit 13. The server 20 includes a voice data acquiring unit 21, a speech recognition unit 22, a conversion dictionary 23, a conversion candidate extracting unit 24, a shared screen managing unit 25, a shared document storage unit 26, a shared history storage unit 27, a selection candidate extracting unit 28, and a speech string determining unit 29.

The functional configuration of the client 10 will be explained first.

The microphone 11 converts sound to electric signals. Here, the speech of a conference participant is converted into voice data in the form of electric signals.

The speech display unit 12 displays speech strings sent from the speech string determining unit 29 of the server 20 in the speech display area 103 of the electronic conferencing screen 100. The speech display unit 12 may also record speech strings as text data.

The shared screen display unit 13 displays shared screens sent from the shared screen managing unit 25 of the server 20 in the shared screen display area 101 of the electronic conferencing screen 100. Here, the shared screen display unit 13 displays a shared document on the shared screen when the shared screen sent from the shared screen managing unit 25 of the server 20 includes a shared document.

The functional configuration of the server 20 will now be explained.

The voice data acquiring unit 21 receives voice data from the microphones 11 of all clients 10 and records the time the voice data was received as the comment time. The voice data is sent to the speech recognition unit 22, and the comment time is sent to the selection candidate extracting unit 28. A voice data acquiring unit 21 may be provided in each client 10 instead of in the server 20. In the present embodiment, the voice data acquiring unit 21 is provided as an example of a receiving unit for receiving voice data.

The speech recognition unit 22 recognizes phonemes (vowels and consonants in the language to be recognized) in the voice data sent from the voice data acquiring unit 21. A series of recognized phonemes is sent to the conversion candidate extracting unit 24. In the present embodiment, the speech recognition unit 22 is provided as an example of an acquisition unit for acquiring phoneme data corresponding to voice data.

Figure 9:
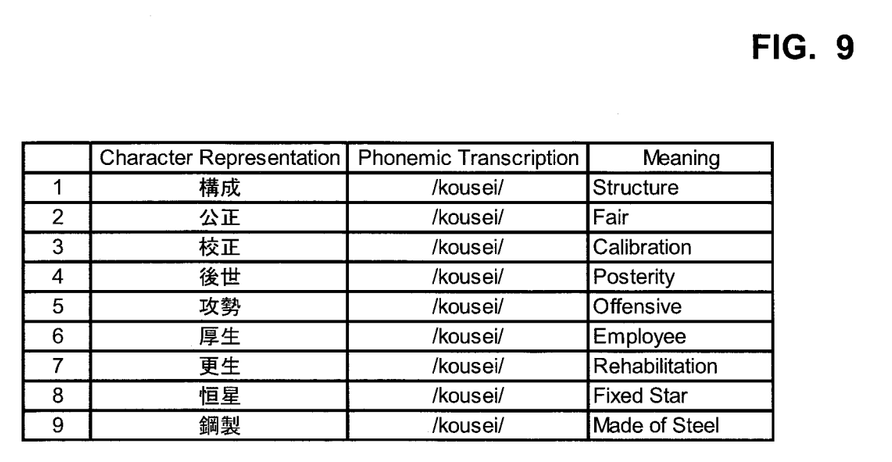
FIG. 9 is a table showing the character string representations, phonemic transcriptions, and meanings of the Japanese words referred to in accordance with embodiments of the present invention.

The conversion dictionary 23 is a database in which a string representation and pronunciation (phonemic representation) are associated with and registered for each word. As illustrated in FIG. 9, a table illustrating character string representations, phonemic transcriptions, and meanings of the Japanese words are referred to below. The nine words in the drawing have the same phoneme (/kousei/). The meanings do not have to be included in the database, but have been added to FIG. 9 in order to help understand the present invention. In the following explanation, these words are referred to as "kousei 1", "kousei 2", . . . "kousei 9".

The conversion candidate extracting unit 24 extracts from the conversion dictionary 23 all words associated with the phonemes sent from the speech recognition unit 22, that is, all string representations whose phonemes match the pronunciation. For example, when the phoneme is /kousei/, the homophonic heterographs "kousei 1", "kousei 2", "kousei 3", "kousei 4", "kousei 5", "kousei 6", "kousei 7", "kousei 8", and "kousei 9" are extracted. All of the extracted strings are sent to the speech string determining unit 29. In the present embodiment, the conversion candidate extracting unit 24 is provided as an example of a identifying unit for identifying at least one conversion candidate.

The shared screen managing unit 25 enables conference participants to view one or more shared screens. For example, a shared document used in the electronic conference is displayed on the shared screen. In this case, the shared screen managing unit 25 extracts the shared document from the shared document storage unit 26, and sends the shared document to the shared screen display unit 13 of the clients 10. The shared screen can be displayed on the screen of the client 10 of each conference participant, or can be displayed as video captured by each conference participant on a camera. The shared screen managing unit 25 can also accommodate a pointer (an indicator used to point to a specific position on the screen using a mouse or touch panel). The shared screen managing unit 25 records in the shared history storage unit 27 information such as the page of the shared document and the location of the pointer displayed on the shared screen at each time.

The shared document storage unit 26 stores shared documents uploaded by conference participants to the server 20 beforehand for use in an electronic conference. More specifically, the shared documents are stored along with an assigned document ID.

The shared history storage unit 27 stores a shared history which time stamps document IDs and page numbers of shared documents displayed on the shared screen during an electronic conference, as well as the pointer locations displayed on the shared screen during the electronic conference. When the shared history is queried using a time as a key, the document ID and page number of the document being shared at that time can be obtained along with the location of the pointer.

The selection candidate extracting unit 28 extracts possible strings that are the topic of conversation at a given time on the basis of the shared history stored in the shared history storage unit 27 (the document ID and page number of the shared document currently being displayed, the document ID and page number of the shared document displayed previously, and location of the point currently being displayed), and on the basis of the shared documents stored in the shared document storage unit 26. Scores are then assigned to each string. A higher score indicates a higher probability that the string is the topic of conversation. All strings assigned a score are sent to the speech string determining unit 29 as selection candidate strings, which are criteria to select a conversion candidate from conversion candidate strings. In the present embodiment, the selection candidate extracting unit 28 is provided as an example of a scoring unit for scoring conversion candidates.

The speech string determining unit 29 compares the conversion candidate strings sent from the conversion candidate extracting unit 24 to the selection candidate strings sent from the selection candidate extracting unit 28. When a matching string has been found, the string is determined to be the spoken string (referred to below as the "comment string"). When more than one matching string has been found, the selection candidate string assigned the higher score is determined to be the comment string. When no matching character string has been found, the comment string is determined using an existing speech recognition technique using a dictionary or statistical method. The comment string is sent to the comment display area 103 of each client 10. In the present embodiment, the speech string determining unit 29 is provided as an example of a selection unit for selecting text data and as an example of a transmitting unit for transmitting text data.

First, when a conference participant speaks, the spoken voice of the participant is captured by the microphone 11 in the client 10, and the voice data is transmitted to the server 20. At this time, identifying information for the conference participant who is speaking is also sent from the client 10 to the server 20.

The voice data acquiring unit 21 in the server 20 receives the voice data, and records the time at which the voice data was received as the comment time. It then sends the voice data to the speech recognition unit 22, and the time of the comment time to the selection candidate extracting unit 28.

Here, the speech recognition unit 22 receiving the voice data from the voice data acquiring unit 21 recognizes the phonemes in the voice data, and sends the phonemes to the conversion candidate extracting unit 24.

The conversion candidate extracting unit 24 extracts from the conversion dictionary 23 the character representations of all words associated with the phonemes sent from the speech recognition unit 22, and these are sent as conversion candidate strings to the speech string determining unit 29.

The selection candidate extracting unit 28 receiving the comment time from the voice data acquiring unit 21 extracts the possible strings that are the topic of conversation at the comment time, and sends these as selection candidate strings to the speech string determining unit 29. The following is a more detailed explanation of the operations performed by the selection candidate extracting unit 28 at this time.

Figure 4:
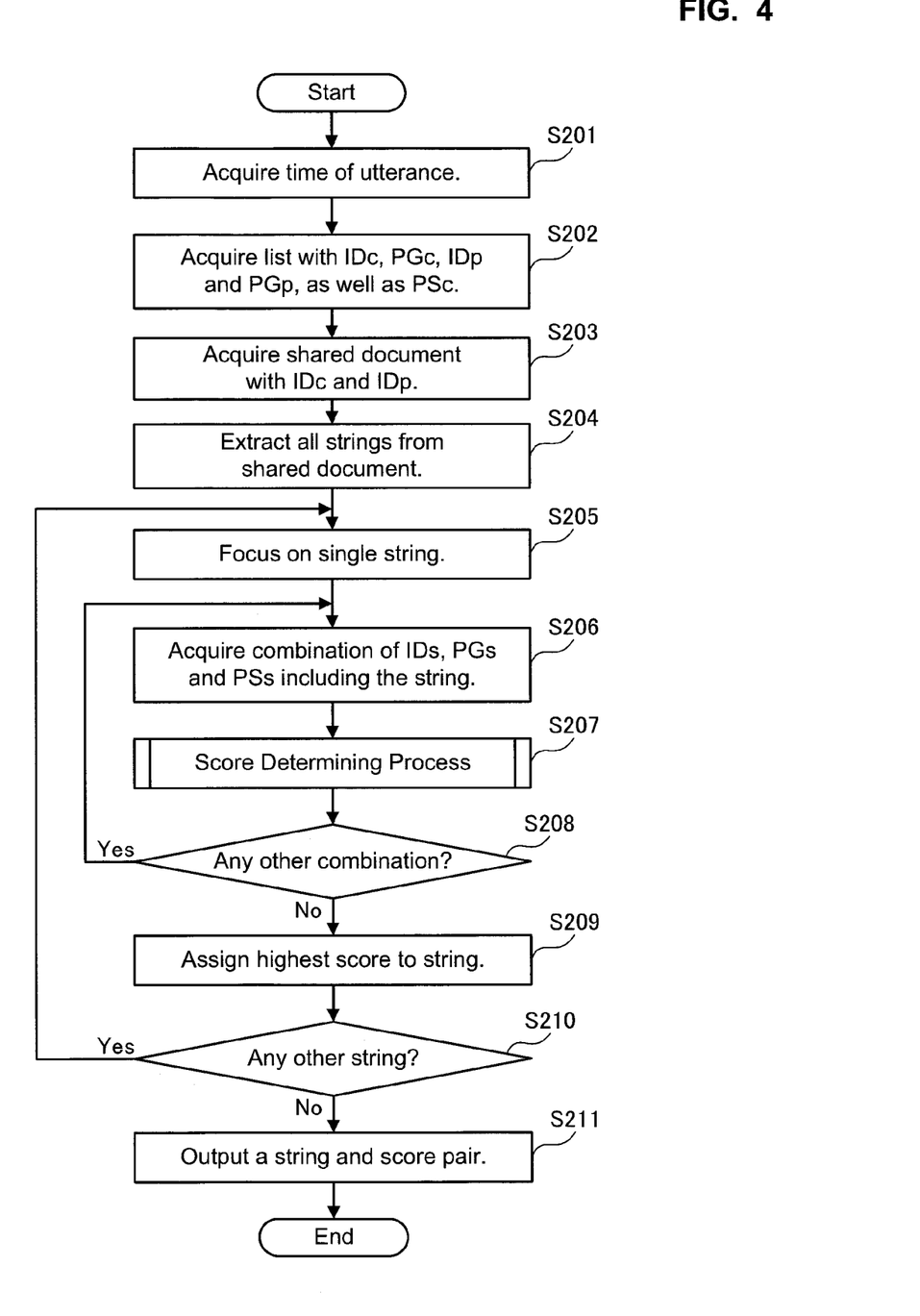
FIG. 4 is a flowchart showing an example of the operations performed by the selection candidate extracting unit of the electronic conferencing system in accordance with embodiments of the present invention.
Figure 5:
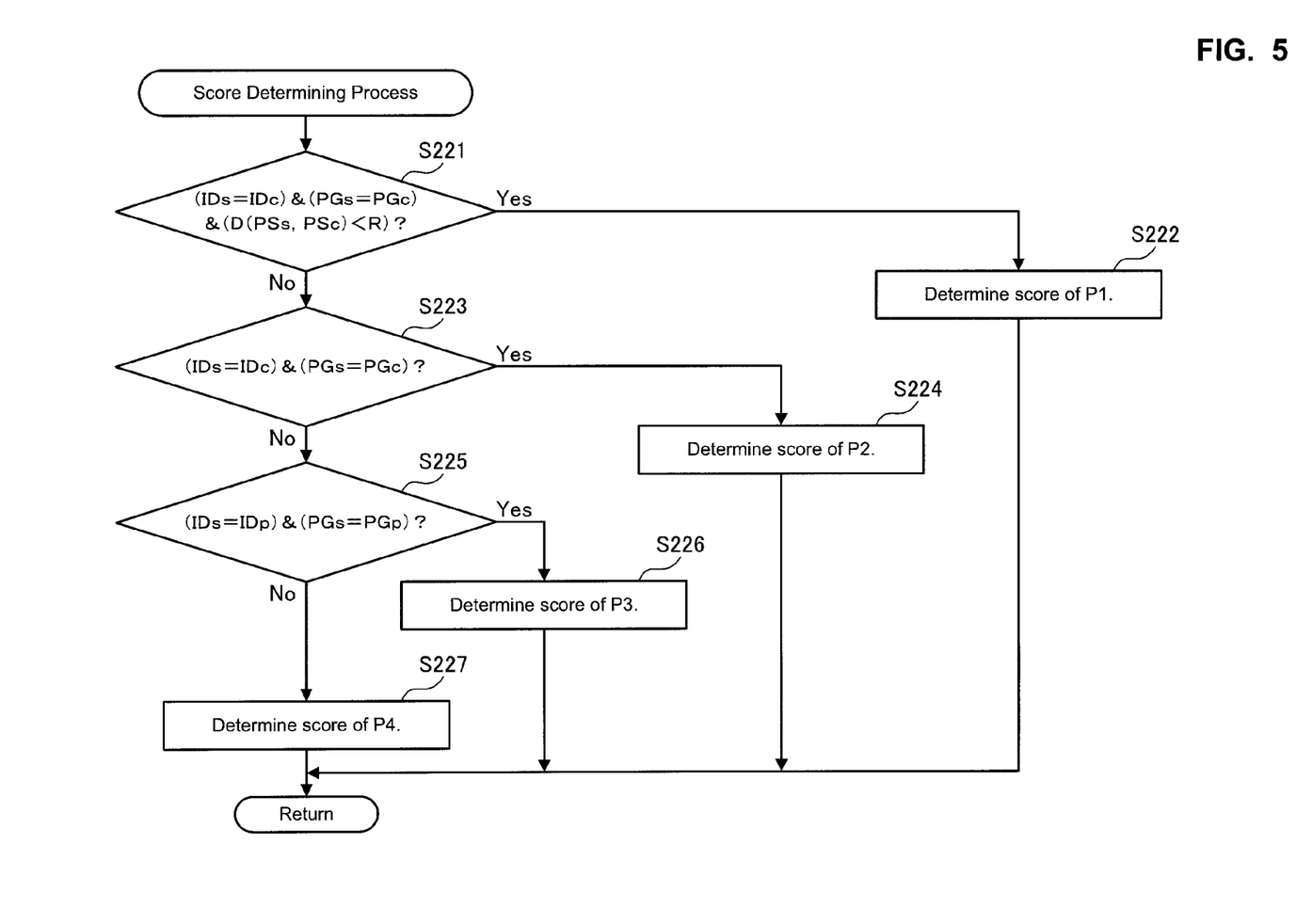
FIG. 5 is a flowchart showing an example of the operations performed by the selection candidate extracting unit of the electronic conferencing system in accordance with embodiments of the present invention.

FIG. 4 and FIG. 5 illustrate flowcharts showing an example of the operations performed by the selection candidate extracting unit 28, in accordance with embodiments of the present invention.

As shown in FIG. 4, the selection candidate extracting unit 28 first receives the comment time from the voice data acquiring unit 21 (Step 201).

Next, the selection candidate extracting unit 28 acquires, from the shared history stored in the shared history storage unit 27, the document ID (IDc) and the page number (PGc) for the page of the shared document displayed at the comment time on the shared screen display area 101, acquires a list of document IDs (IDp) and page numbers (PGp) for the pages of the shared documents displayed on the shared screen display area 101 prior to the comment time, and acquires the pointer location (PSc) at the comment time (Step 202).

Next, the selection candidate extracting unit 28 extracts, from the shared document storage unit 26, the shared documents with the document IDs (IDc and IDp) acquired in Step 202 (Step 203). It then extracts all strings from all shared documents acquired in Step 203 (Step 204).

Next, the selection candidate extracting unit 28 takes a single string from the strings extracted in Step 204 (Step 205), and assigns a score to the string. In other words, the selection candidate extracting unit 28 acquires a single combination of a document ID (IDs) of a shared document including the string, the page number (PGs) of a page of a shared document including the string, and the location (PSs) on the page of the string (Step 206). Next, the selection candidate extracting unit 28 determines a score for a string using this combination by performing the score determining process described below (Step 207). Next, the selection candidate extracting unit 28 determines whether there is any other IDs, PGs and PSs combination (Step 208). When it has determined that there is another IDs, PGs and PSs combination, it performs the process in Step 206 and Step 207 on this combination. When it has determined that there is not another IDs, PGs and PSs combination, it assigns the highest score among the scores determined in Step 207 up to this point to the string (Step 209).

Afterwards, the selection candidate extracting unit 28 determines whether there is any unprocessed string among the strings extracted in Step 204 (Step 210). When it has determined that there is an unprocessed string, the process in Step 205 through Step 209 is performed on the unprocessed string. When it has determined that there is no unprocessed string, the strings assigned a score are sent as selection candidate strings along with their score to the speech string determining unit 29 (Step 211).

The following is a description of the score determining process executed in Step 207.

As shown in FIG. 5, the selection candidate extracting unit 28 first determines whether or not the pointer is close to a given string at the time of the utterance. In other words, it determines whether or not the following conditions have been met: IDs=IDc, PGs=PGc and D (PSs, PSc)<R (Step 221). Here D(X, Y) is the distance between position X and position Y, and R is the radius of the circle to determine the proximity of the pointer (referred to as the "proximity-determining circle" below). The radius R of the proximity-determining circle can be established by the user. When the result of the determination performed in Step 221 indicates that a given string is close to the pointer at the time of the utterance, that is, that the conditions have been met, the selection candidate extracting unit 28 assigns a score of P1 to the string (Step 222).

When the result of the determination indicates that a given string is not close to the pointer at the time of the utterance, the selection candidate extracting unit 28 determines whether or not the string is present on the page of the shared document being displayed at the time of the utterance. In other words, it determines whether or not the following conditions have been met: IDs=IDc and PGs=PGc (Step 223). When it has determined that the string is present on the page of the shared document being displayed at the time of the utterance, that is, that the conditions have been met, it assigns a score of P2 to the string (Step 224).

When it has determined that the string is not present on the page of the shared document being displayed at the time of the utterance, the selection candidate extracting unit 28 determines whether or not the string is included on a page of the shared document displayed prior to the time of the utterance. In other words, it determines whether or not the following conditions have been met: "IDs=IDp" and "PGs=PGp" (Step 225). When it has been determined that the string is included on a page of the shared document displayed prior to the time of the utterance, that is, that the conditions have been met, a score of P3 is assigned to the string (Step 226).

When it has been determined that the string is included in the shared document but is not included on a page of the shared document displayed prior to the time of the utterance, that is, that the conditions have been met, a score of P4 is assigned to the string (Step 227).

In this operational example, the scores determined in Steps 222, 224, 226 and 227 were P1, P2, P3 and P4, respectively. A string close to the pointer at the time of the utterance, a string included on the page of the shared document displayed at the time of the utterance, a string included in a page of the shared document displayed prior to the time of the utterance, and a string included in the shared document but not on a page of the shared document displayed prior to the time of the utterance are preferably assigned scores in the descending order P1, P2, P3 and P4, indicating the decreasing likelihood of the string being the spoken string. For example, a score of P1, P2, P3 and P4 may be assigned four points, three points, two points and one point, respectively.

When the conversion candidate extracting unit 24 has sent conversion candidate strings to the speech string determining unit 29, and the selection candidate extracting unit 28 has sent selection candidate strings to the speech string determining unit 29, the speech string determining unit 29 selects the selection candidate string that has been assigned the highest score. The selected character string is then sent to the clients 10 of all conference participants as the comment string. Next, the comment display unit 12 in the clients 10 displays the comment string in the comment display area 103. Because the identifying information for the conference participant making the comment is also sent by the server 20 to the clients 10, the speech display unit 12 displays the comment string along with the identifying information for the conference participant making the comment.

In this operational example, a string meeting the conditions in Step 221 is assigned a score of P1, a string not meeting the conditions in Step 221 but meeting the conditions in Step 223 is assigned a score of P2, and a string not meeting the conditions in either Step 221 or Step 223 but meeting the conditions in Step 225 is assigned a score of P3. However, the present invention is not restricted to this operational example. For example, a string meeting the conditions in Step 223 or Step 225 can be assigned a score of P1 without determining whether or not the conditions in Step 221 have been satisfied. In other words, any string may be extracted and given the highest priority as a selection candidate string when it appears on a page of a shared document displayed during a session of an electronic conference.

In this operational example, a string meeting the conditions in Step 221 is assigned a score of P1, and a string not meeting the conditions in Step 221 but meeting the conditions in Step 223 is assigned a score of P2. However, the present invention is not restricted to this operational example. For example, a string meeting the conditions of Step 223 may be assigned a score of P1 without determining whether or not the conditions in Step 221 have been met. In other words, any string may be extracted and given the highest priority as a selection candidate string when it appears on the page of a shared document displayed at the time of the utterance.

In this operational example, a string appearing in a shared document but not meeting the conditions of Step 221, Step 223 and Step 225 is assigned a score of P4. However, the present invention is not restricted to this operational example. For example, a string included in the shared document may be assigned a score of P1 when a portion of the string appears in the shared document and meets the conditions of Step 223. In other words, any string may be extracted and given the highest priority as a selection candidate string when at least it appears on a shared document displayed prior the time of the utterance.

Figure 6:
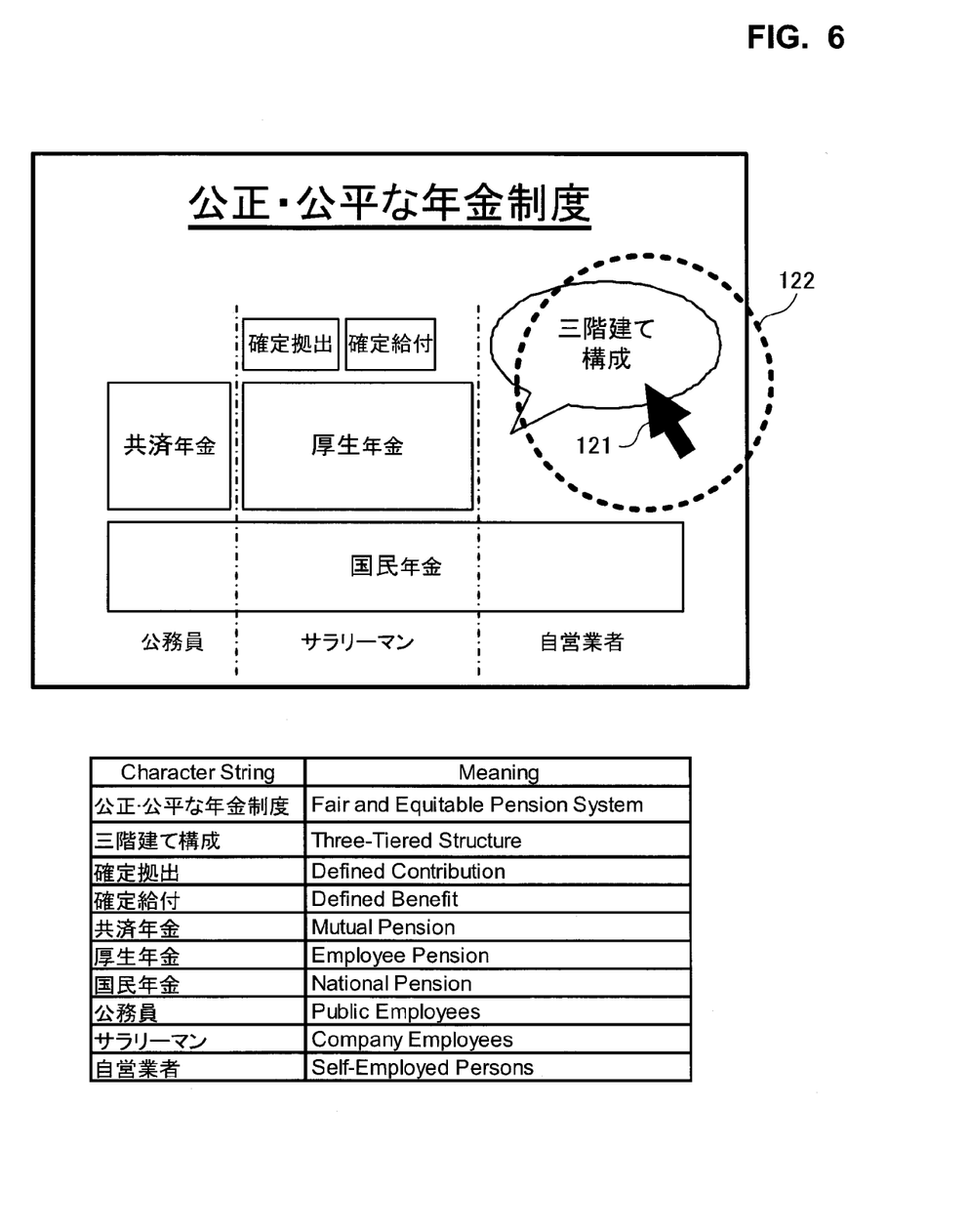
FIG. 6 is a diagram showing an example of a shared document displayed on the shared screen in the shared screen display area in accordance with embodiments of the present invention.

FIG. 6 illustrates a diagram showing an example of a shared document displayed on the shared screen in the shared screen display area 101, in accordance with embodiments of the present invention. A bilingual table of the character strings has been added below the drawing in order to help understand the present invention. Here, the page of the shared document shown in the drawing was displayed on the shared screen at the time of the utterance. The graphics that do not appear on the actual page include the pointer 121 shown in the drawing. In this case, information indicating the time of the utterance, the page number of the page of the shared document, and the position of the pointer 121 is stored in the shared history storage unit 27.

FIG. 6 only illustrates the page of the shared document appearing on the shared screen at the time of the utterance. Other pages of the same shared document displayed on the shared screen prior to the time of the utterance, or other shared documents may also be displayed, but these have been omitted from the drawing.

The graphics that do not appear on the actual page include the proximity-determining circle 122 centered on the pointer 121. Among the homophonic heterographic strings corresponding to the phoneme /kousei/, such as "kousei 1", "kousei 2", and "kousei 6", only "kousei 1" appears inside the proximity-determining circle 122 on the page shown in the drawing.

In this situation, the conference participant utters the word "kousei". In response, the microphone 11 of the client 10 captures the voice of the conference participant, and transmits the voice data.

The voice data acquiring unit 21 in the server 20 receives the voice data, and records the time received as the time of the utterance.

The conversion candidate extracting process is performed first. In other words, the voice data acquiring unit 21 sends the voice data to the speech recognition unit 22. The speech recognition unit 22 recognizes the voice data as phonemes, and sends the phonemes "/kousei/" to the conversion candidate extracting unit 24. The conversion candidate extracting unit 24 then extracts strings corresponding to the phonemes "/kousei/". For example, the conversion candidate extracting unit 24 extracts homophonic heterographs "kousei 1", "kousei 2", "kousei 3", "kousei 4", "kousei 5", "kousei 6", "kousei 7", "kousei 8", and "kousei 9", and sends them to the speech string determining unit 29 as comment string candidates.

The selection candidate extraction process is also performed. The voice data acquiring unit 21 sends the time of the utterance to the selection candidate extracting unit 28. The selection candidate extracting unit 28 acquires, from the shared document storage unit 26 and shared history stored in the shared history storage unit 27, the content of the pages of the shared document displayed on the shared screen at and prior to the time of the utterance, and the position of the pointer on the shared screen at the time of the utterance. Strings are then extracted from the content of the pages of the shared document displayed on the shared screen at and prior to the time of the utterance, and a score is assigned to each string. Afterwards, the selection candidate extracting unit 28 sends the strings along with their scores to the speech string determining unit 29.

Figure 7:
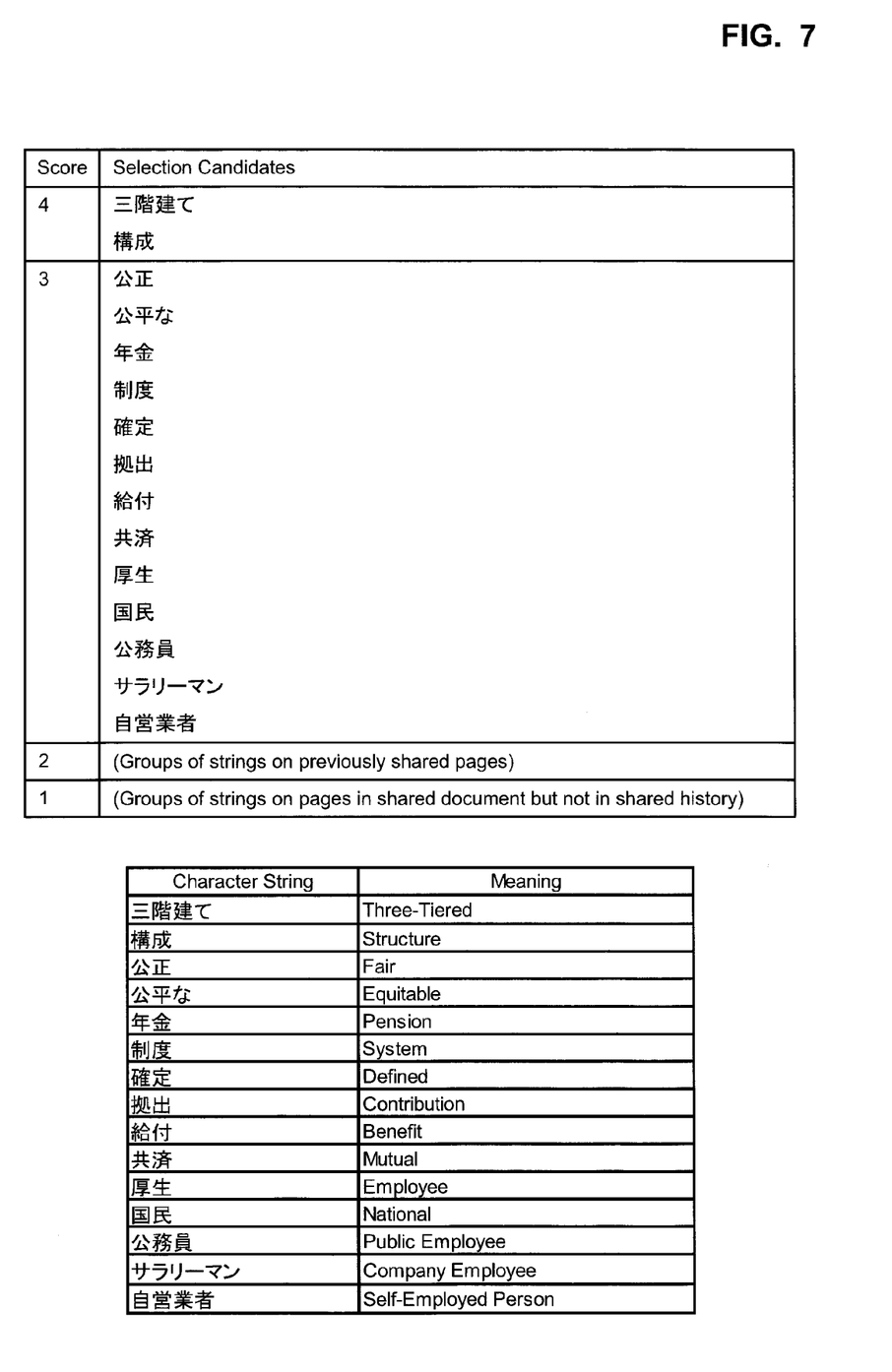
FIG. 7 is a diagram showing an example of a list of scores and strings outputted by the selection candidate extracting unit in accordance with embodiments of the present invention.

FIG. 7 illustrates a diagram showing an example of a list of scores and strings sent by the selection candidate extracting unit 28 to the speech string determining unit 29 in this situation, in accordance with embodiments of the present invention. A bilingual table of the character strings has been added below the drawing in order to help understand the present invention. In this drawing, as described with reference to FIG. 5, strings close to the pointer at the time of the utterance have been assigned four points, strings included in the page of the shared document displayed at the time of the utterance are assigned three points, strings included on a page of the shared document displayed prior to the time of the utterance are assigned two points, and strings included in the shared document but not on a page of the shared document displayed at or prior to the time of the utterance are assigned one point. Therefore, among the homophonic heterographic strings corresponding to the phoneme /kousei/ ("kousei 1", "kousei 2", "kousei 6"), only "kousei 1", which is inside the proximity-determining circle 122, is assigned four points, and "kousei 1" and "kousei 6", which are outside of the proximity-determining circle 122 but on the page of the shared document displayed at the time of the utterance, are both assigned three points.

The speech string determining unit 29 matches the selection candidate strings and the conversion candidate strings. The results of the matching process yield "kousei 1", "kousei 2" and "kousei 6". The speech string determining unit 29 selects "kousei 1" because it has the highest score, and sends the string to the speech display unit 12 in all of the clients 10.

The speech display units 12 in the clients 10 all display "kousei 1" in the comment display area 103.

In these operations, the conversion candidate extracting process and the selection candidate extracting process can be performed in parallel.

In the present embodiment, as described above, the conversion candidates appearing in a shared document viewed by the users on a shared screen were given priority among the conversion candidates corresponding to the phonemes obtained using speech recognition, and the text data was determined after conversion. This is able to improve the accuracy of voice to text conversion in a system enabling multiple users to hold an electronic conference.

The present embodiment was applied to an electronic conferencing system, but the present invention is not restricted to this application. For example, the present invention can also be applied to a chat system. In an electronic conferencing system, it is assumed that a shared document is being referenced when voice data entered by a user is converted to text data. In a chat system it is assumed that a shared document is being referenced when text data entered by a user in a first language is converted to text data in a second language. More generally, the present invention can be described as referencing a shared document when data conversion is performed in a system enabling multiple users to exchange data. In this case, voice data is the first type of data, and text data is the second type of data. More generally, the system may not include the configuration corresponding to the speech recognition unit 22 and may instead convert a first type of data directly into a second type of data.

In the present embodiment, a shared document was referenced during the conversion of data. However, the present invention is not restricted to this embodiment. For example, when information other than a shared document is displayed on the shared screen at a given time, and the time, the strings included in this information, and the position of the pointer at this time are recorded as shared history, the information can be referenced during data conversion to select a string from among the conversion candidates. In this case, the present embodiment can be understood more generally to select a string from among conversion candidates on the basis of the state in which the strings are displayed on the shared screen.

Finally, a computer hardware configuration able to embody the present embodiment will be explained.

Figure 8:
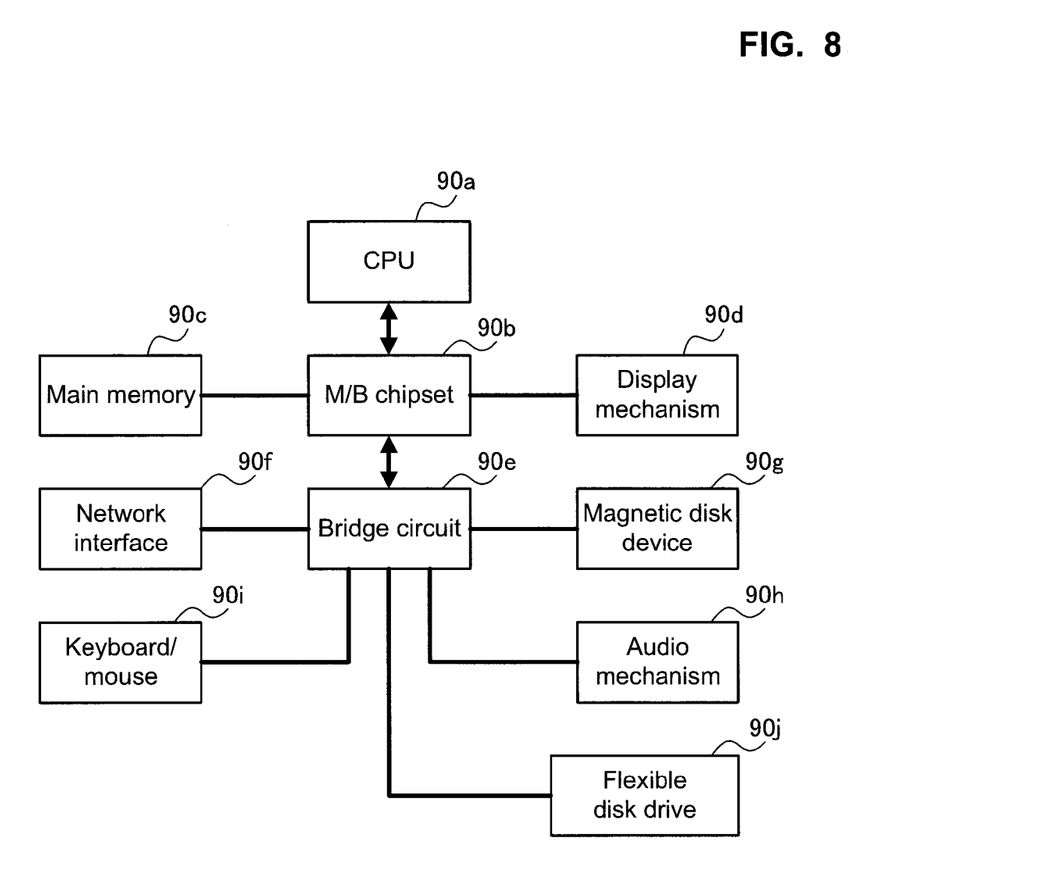
FIG. 8 is a diagram showing an example of a computer hardware configuration table to realize in accordance with embodiments of the present invention.

FIG. 8 illustrates a diagram showing an example of such a computer hardware configuration, in accordance with embodiments of the present invention. As shown in the drawing, the computer includes a central processing unit (CPU) 90a serving as a computing means, a main memory storage device 90c connected to the CPU 90a via a motherboard (M/B) chip set 90b, and a display mechanism 90d connected to the CPU 90a via the same M/B chip set 90b. A network interface 90f, magnetic disk device (HDD) 90g, audio mechanism 90h, keyboard/mouse 90i, and flexible disk drive 90j are also connected to the M/B chip set 90b via a bridge circuit 90e.

In FIG. 8, the various configurational elements are connected via a bus. For example, the CPU 90a and the M/B chip set 90b, and the M/B chip set 90b and the main memory 90c are connected via a CPU bus. Also, the M/B chip set 90b and the display mechanism 90d may be connected via an accelerated graphics port (AGP). However, when the display mechanism 90d includes a PCI express-compatible video card, the M/B chip set 90b and the video card are connected via a PCI express (PCIe) bus. Also, PCI Express can be used as the network interface 90f if, for example, it is connected to the bridge circuit 90e. Examples of magnetic disk devices 90g include a serial AT attachment (ATA), a parallel-transmission ATA, and a peripheral components interconnect (PCI). The keyboard/mouse 90i and the flexible disk drive 90j can use a universal serial bus (USB).

The present invention can be realized using all hardware or all software. It can also be realized using a combination of both hardware and software. The present invention can also be realized as a computer, data processing system, or computer program. The computer program can be stored and distributed on a computer-readable medium. Here, the medium can be electronic, magnetic, optical, mechanical, infrared, or a semiconductor system (device or equipment). It can also be a propagation medium. Examples of computer-readable media include semiconductors, solid-state storage devices, magnetic tape, removable computer diskettes, random-access memory (RAM), read-only memory (ROM), rigid magnetic disks, and optical disks. Examples of optical disks at the present time include compact disk read-only memory (CD-ROM) disks, compact disk read/write (CD-R/W) disk, and DVDs.

Still yet, any of the components of the present invention could be created, integrated, hosted, maintained, deployed, managed, serviced, etc. by a service supplier who offers to enable a process for scoring conditions and presenting results. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for scoring conditions and presenting results. In another embodiment, the invention provides a business method that performs the process steps of the invention on a subscription, advertising, and/or fee basis. That is, a service supplier, such as a Solution Integrator, could offer to enable a process for scoring conditions and presenting results. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In

What is claimed is:

1. A method for converting voice data to text data, the method comprising:

presenting, by a computer processor of a computing system via a first portion of a shared screen, a shared document viewed by a plurality of users during a data exchange session of a remotely operated electronic conference;

presenting, by said computer processor via a second portion of said shared screen, a list identifying each of said plurality of users;

receiving, by said computer processor of a computing system executing a receiving unit, voice data, associated with said shared document, from a terminal device used by at least one user of said plurality of users;

determining, by said computer processor executing a recognition unit, phoneme data items corresponding to the voice data;

identifying, by said computer processor executing an identifying unit, a plurality of conversion candidate string representations of the phoneme data items by referencing a conversion dictionary defining the conversion candidate string representations for each phoneme data item of the phoneme data items;

scoring, by said computer processor executing a scoring unit, the plurality of conversion candidate string representations displayed on a shared screen viewed by the plurality of users during a data exchange session, said scoring comprising:

assigning a first score to a first conversion candidate string representation of the plurality of conversion candidate string representations, wherein the first conversion candidate string representation is displayed within said shared document within a predetermined range of a position of a cursor on the shared screen during reception of the voice data, assigning a second score to a second conversion candidate string representation of the plurality of conversion candidate string representations, wherein the second conversion candidate string representation is displayed within said shared document outside of the position of the predetermined range of the curser on the shared screen during reception of the voice data, and wherein the second score is less than the first score, and assigning a third score to a third conversion candidate string representation of the plurality of conversion candidate string representations, wherein the third conversion candidate string representation was displayed within said shared document on the shared screen prior to reception of the voice data, and wherein the third score is less than the second score;

selecting as text data, by said computer processor from the plurality of conversion candidate string representations, the first conversion candidate string representation, the second conversion candidate string representation, or the third conversion candidate string representation based on the first score, the second score, and the third score;

presenting, by said computer processor via a third portion of said shared screen, the text data;

applying, by said computer processor executing a shared history storage unit, timestamps to a document ID and associated page numbers of said shared document, wherein said timestamps are associated with a time period associated with said receiving said voice data;

recording, by said computer processor executing said shared history storage unit, various positions of said curser with respect to said shared document occurring during said receiving said voice data; and storing, by said computer processor within said shared history storage unit, said timestamps, results of said recording, and said text data.

2. The method of claim 1, further comprising:
recording, by said computer processor, a specified time value associated with said receiving said voice data, wherein said selecting is further based on said specified time value.

3. The method of claim 2, wherein said scoring is performed based on said specified time value.

4. The method of claim 1, further comprising:
recording, by said computer processor, a page of said shared document and associated positions of said curser.

5. The method of claim 1, wherein said selecting results in said first conversion candidate string being selected, and wherein said method further comprises:
determining, by said computer processor, that said first conversion candidate string comprises a comment string associated with a specified comment within said voice data.

6. The method of claim 1, wherein said conversion candidate string representations comprise shared terminology associated with said plurality of users.

7. The method of claim 1, further comprising:
converting, by said computer processor, said text data in to a plurality of differing languages associated with said plurality of users.

8. The method of claim 1, further comprising:
providing at least one support service for at least one of creating, integrating, hosting, maintaining, and deploying computer-readable code in the computing system, said code being executed by the computer processor to implement: said receiving, said determining, said identifying, said scoring, said selecting, and said transmitting.

9. A computing system comprising a computer processor coupled to a computer-readable memory unit, said memory unit comprising instructions that when executed by the computer processor implements a method comprising:
presenting, by a computer processor via a first portion of a shared screen, a shared document viewed by a plurality of users during a data exchange session of a remotely operated electronic conference;
presenting, by said computer processor via a second portion of said shared screen, a list identifying each of said plurality of users;
receiving, by said computer processor executing a receiving unit, voice data, associated with said shared document, from a terminal device used by at least one user of said plurality of users;
determining, by said computer processor executing a recognition unit, phoneme data items corresponding to the voice data;
identifying, by said computer processor executing an identifying unit, a plurality of conversion candidate string representations of the phoneme data items by referencing a conversion dictionary defining the conversion candidate string representations for each phoneme data item of the phoneme data items;
scoring, by said computer processor executing a scoring unit, the plurality of conversion candidate string representations displayed on a shared screen viewed by the plurality of users during a data exchange session, said scoring comprising:
assigning a first score to a first conversion candidate string representation of the plurality of conversion candidate string representations, wherein the first conversion candidate string representation is displayed within said shared document within a predetermined range of a position of a cursor on the shared screen during reception of the voice data,
assigning a second score to a second conversion candidate string representation of the plurality of conversion candidate string representations, wherein the second conversion candidate string representation is displayed within said shared document outside of the position of the predetermined range of the curser on the shared screen during reception of the voice data, and wherein the second score is less than the first score, and
assigning a third score to a third conversion candidate string representation of the plurality of conversion candidate string representations, wherein the third conversion candidate string representation was displayed within said shared document on the shared screen prior to reception of the voice data, and wherein the third score is less than the second score;
selecting as text data, by said computer processor from the plurality of conversion candidate string representations, the first conversion candidate string representation, the second conversion candidate string representation, or the third conversion candidate string representation based on the first score, the second score, and the third score;
presenting, by said computer processor via a third portion of said shared screen, the text data;
applying, by said computer processor executing a shared history storage unit, timestamps to a document ID and associated page numbers of said shared document, wherein said timestamps are associated with a time period associated with said receiving said voice data;
recording, by said computer processor executing said shared history storage unit, various positions of said curser with respect to said shared document occurring during said receiving said voice data; and
storing, by said computer processor within said shared history storage unit, said timestamps, results of said recording, and said text data.

10. The computing system of claim 9, wherein said method further comprises:
recording, by said computer processor, a specified time value associated with said receiving said voice data, wherein said selecting is further based on said specified time value.

11. The computing system of claim 10, wherein said scoring is performed based on said specified time value.

12. The computing system of claim 9, wherein said method further comprises:
recording, by said computer processor, a page of said shared document and associated positions of said curser.

13. The computing system of claim 9, wherein said method further comprises:
wherein said selecting results in said first conversion candidate string being selected, and wherein said method further comprises:

determining, by said computer processor, that said first conversion candidate string comprises a comment string associated with a specified comment within said voice data.

14. The computing system of claim 9, wherein said conversion candidate string representations comprise shared terminology associated with said plurality of users.

15. The computing system of claim 9, wherein said method further comprises:
converting, by said computer processor, said text data in to a plurality of differing languages associated with said plurality of users.

16. A computer program product, comprising a non-transitory computer readable hardware storage device storing a computer readable program code, said computer readable program code comprising an algorithm that when executed by a computer processor of a computing system implements a method, said method comprising:
presenting, by a computer processor via a first portion of a shared screen, a shared document viewed by a plurality of users during a data exchange session of a remotely operated electronic conference;
presenting, by said computer processor via a second portion of said shared screen, a list identifying each of said plurality of users;
receiving, by said computer processor executing a receiving unit, voice data, associated with said shared document, from a terminal device used by at least one user of said plurality of users;
determining, by said computer processor executing a recognition unit, phoneme data items corresponding to the voice data;
identifying, by said computer processor executing an identifying unit, a plurality of conversion candidate string representations of the phoneme data items by referencing a conversion dictionary defining the conversion candidate string representations for each phoneme data item of the phoneme data items;
scoring, by said computer processor executing a scoring unit, the plurality of conversion candidate string representations displayed on a shared screen viewed by the plurality of users during a data exchange session, said scoring comprising:
assigning a first score to a first conversion candidate string representation of the plurality of conversion candidate string representations, wherein the first conversion candidate string representation is displayed within said shared document within a predetermined range of a position of a cursor on the shared screen during reception of the voice data,
assigning a second score to a second conversion candidate string representation of the plurality of conversion candidate string representations, wherein the second conversion candidate string representation is displayed within said shared document outside of the position of the predetermined range of the curser on the shared screen during reception of the voice data, and wherein the second score is less than the first score, and
assigning a third score to a third conversion candidate string representation of the plurality of conversion candidate string representations, wherein the third conversion candidate string representation was displayed within said shared document on the shared screen prior to reception of the voice data, and wherein the third score is less than the second score;
selecting as text data, by said computer processor from the plurality of conversion candidate string representations, the first conversion candidate string representation, the second conversion candidate string representation, or the third conversion candidate string representation based on the first score, the second score, and the third score;
presenting, by said computer processor via a third portion of said shared screen, the text data;
applying, by said computer processor executing a shared history storage unit, timestamps to a document ID and associated page numbers of said shared document, wherein said timestamps are associated with a time period associated with said receiving said voice data;
recording, by said computer processor executing said shared history storage unit, various positions of said curser with respect to said shared document occurring during said receiving said voice data; and
storing, by said computer processor within said shared history storage unit, said timestamps, results of said recording, and said text data.

17. The computer program product of claim 16, wherein said method further comprises:
recording, by said computer processor, a specified time value associated with said receiving said voice data, wherein said selecting is further based on said specified time value.

18. The computer program product of claim 17, wherein said scoring is performed based on said specified time value.

19. The computer program product of claim 16, wherein said method further comprises:
recording, by said computer processor, a page of said shared document and associated positions of said curser.

20. The computer program product of claim 16, wherein said method further comprises:
wherein said selecting results in said first conversion candidate string being selected, and wherein said method further comprises:
determining, by said computer processor, that said first conversion candidate string comprises a comment string associated with a specified comment within said voice data.

\* \* \* \* \*